United States Patent [19]
Hardeng et al.

[11] Patent Number: 5,909,335
[45] Date of Patent: Jun. 1, 1999

[54] TAPE DRIVE START UP AND STOP TAPE SPEED CONTROL

[75] Inventors: Erik Hardeng; Georg Boasson, both of Oslo, Norway

[73] Assignee: Tandberg Data ASA, Oslo, Norway

[21] Appl. No.: 08/786,081

[22] Filed: Jan. 17, 1997

[51] Int. Cl.$^6$ .................................................. G11B 15/48
[52] U.S. Cl. .................. 360/74.2; 360/73.09; 360/73.04
[58] Field of Search ............................... 360/74.1, 69, 70, 360/73.01, 73.04, 73.08, 73.09, 73.11, 74.3, 75, 74.2; 24/189, 190, 334.6, 412.2, 413.5

[56] References Cited

U.S. PATENT DOCUMENTS

| | | |
|---|---|---|
| 3,225,902 | 12/1965 | Roinestad . |
| 3,714,393 | 1/1973 | Johnson et al. . |
| 3,803,632 | 4/1974 | Irwin et al. . |
| 4,072,893 | 2/1978 | Huwyler . |
| 4,107,745 | 8/1978 | Burke, Jr. . |
| 4,190,869 | 2/1980 | Ota . |
| 4,390,909 | 6/1983 | Sakamoto . |
| 4,479,081 | 10/1984 | Harris . |
| 4,514,672 | 4/1985 | O'Gwynn . |
| 4,531,166 | 7/1985 | Anderson . |
| 4,593,335 | 6/1986 | Sato et al. . |
| 4,614,270 | 9/1986 | Oishi . |
| 4,615,682 | 10/1986 | Salvo . |
| 4,618,903 | 10/1986 | Oishi et al. . |
| 4,695,003 | 9/1987 | Moris . |
| 4,696,439 | 9/1987 | Sukigara et al. . |
| 4,729,049 | 3/1988 | Narita . |
| 4,754,938 | 7/1988 | Satoh . |
| 4,797,761 | 1/1989 | Cocco . |
| 4,819,889 | 4/1989 | Satoh . |
| 4,880,181 | 11/1989 | Drahanowsky . |
| 4,894,737 | 1/1990 | Hamana . |
| 4,922,361 | 5/1990 | Bordignon . |
| 4,943,874 | 7/1990 | Takeda et al. . |
| 4,947,279 | 8/1990 | Cousino . |
| 4,962,436 | 10/1990 | Bayer et al. . |
| 4,984,111 | 1/1991 | Rudi . |
| 4,984,112 | 1/1991 | Kletzl et al. . |
| 5,032,938 | 7/1991 | Tajima et al. ........................ 360/73.09 |
| 5,055,956 | 10/1991 | Kaya et al. . |
| 5,150,263 | 9/1992 | Sakamoto et al. . |
| 5,236,146 | 8/1993 | Rudi et al. . |
| 5,253,135 | 10/1993 | Hamana . |
| 5,257,148 | 10/1993 | Solhjell et al. . |
| 5,274,522 | 12/1993 | Taillie . |
| 5,309,300 | 5/1994 | Lee . |
| 5,313,343 | 5/1994 | Yatomi .............................. 360/73.09 X |
| 5,335,116 | 8/1994 | Onishi et al. . |
| 5,367,471 | 11/1994 | Nguyen et al. . |
| 5,379,165 | 1/1995 | Pahr . |
| 5,396,392 | 3/1995 | Watanabe et al. . |
| 5,430,587 | 7/1995 | Engan . |
| 5,438,469 | 8/1995 | Rudi . |
| 5,477,400 | 12/1995 | Kawamata .......................... 360/73.09 |
| 5,491,594 | 2/1996 | Yamamoto et al. . |

*Primary Examiner*—Muhammad N. Edun
*Attorney, Agent, or Firm*—Hill & Simpson

[57] ABSTRACT

A speed servo control for a tape drive comprising a take up reel having tape wound therearound, the tape extending to a supply reel and wound therearound. A flutter roller is arranged to press said tape that extends between the take up reel and the supply reel to rotate with circulation of the tape. A first tachometer is connected to said take up reel to rotate therewith. A second tachometer is connected to the flutter roller to rotate therewith, the first and second tachometers connected to a servo system for controlling the speed of the take up reel drive motor according to the select speed of the tape. The second tachometer from the flutter roller normally controls the servo for controlling the take up reel speed. A mechanism is provided for ignoring a tachometer signal from the second tachometer and controlling using the first tachometer, until the tape is tensioned against the flutter roller after start up. The mechanism for ignoring is advantageously a third tachometer connected to the supply reel and a pulse detector sensing pulses from the third tachometer and signal connected to the switch such that when a certain number of tachometer pulses are sensed from the third tachometer, or a certain stable frequency of pulses is sensed from the third tachometer, the switch is switched from the first tachometer (take up reel) as input, to the second tachometer (flutter roller) as input to the servo system.

20 Claims, 5 Drawing Sheets

TAPE DRIVE START UP AND STOP TAPE SPEED CONTROL

BACKGROUND OF THE INVENTION

The present invention relates to a mechanism for driving a tape at a constant speed in a tape drive. For new high density digital tape recorders which need to run the tape at constant low speed, typically 5–10 cm/sec, this has been heretofore accomplished with a fly wheel capstan, and a pressure roller.

In prior art tape drives which use a capstan and pressure roller, the tape is moved with the speed of the capstan surface. Typical examples of such drives include video recorders, 4 millimeters and 8 millimeters tape drives, and some audio open reel recorders. Such drives are disclosed for example in U.S. Pat. Nos. 4,984,111; 5,323,280; and 3,692,255.

Low speed video tape drives can include the capstan and pressure roller arrangement for translating the tape at a constant speed in addition to a means of turning the reels to wind the tape, such as described in U.S. Pat. Nos. 4,190,869 and 4,390,909.

It is also known to control tape speed by direct tape speed measurement, such as by a roller, and issuing a correction signal to a take up reel motor such as disclosed in 5,491,594; 4,696,439 or 4,514,672; or by calculating tape speed by a reel tachometer and applying correction signals to the take up reel motor such as in U.S. Pat. No. 4,531,166.

SUMMARY OF THE INVENTION

It is an object of the invention to provide a tape speed servo control for assuring accurate tape speed control during start up and stop modes of a tape drive. These modes may only have a duration in the range of milliseconds but unstable starting and stopping tape speed during these periods can lead to tape failure and/or data loss, and decrease in data access response time.

The tape is transported by use of a motor coupled to the take up reel. To achieve sufficient tape tension, a motor coupled to the supply reel is caused to brake slightly. The tape speed and tension are controlled by a controller having a tape speed servo circuit and a tape tension servo circuit. This arrangement provides a minimum of motive mechanical parts to transport the tape.

The tape path consists of a number of stationary guides, and at least one tape roller such as a "flutter" roller. The tape roller has an integrated tachometer for tape speed measurements. This is the most direct way to measure the tape speed. A second tape roller can be provided to obtain a symmetric tape path, which is advantageous in a bidirectional tape transport. The two tape rollers also absorb high frequency speed variations, known as flutter. The lower frequency speed variations are compensated by the tape speed servo circuit of the controller. A description of tape speed and tension control is contained in copending application U.S. Ser. No. 08/786,082 naming as inventors Halvor Kvifte, Steinar Strand, Hans Stavdahl, and Erik Hardeng, assigned to the Assignee of the present application, filed on the same day as the present application.

According to the invention, the tape wrap angle around the flutter rollers is considerable to reduce the total tape friction, and with that reduce the tape tension at the take up reel. Both flutter rollers and tape r eels can have integrated tachometers for providing pulse frequency signals to the controller for calculating and controlling tape speed and tension.

Tape tension is accurately controlled after start up of the tape, by setting the brake moment on the supply reel to the same level as is expected for a full supply reel. This braking is softly reduced when the tension servo circuit has got information about the speeds of reels and rollers to make corrections.

During normal play, the flutter roller measures the tape speed accurately. The tape has controlled tape tension and the tape has enough contact with the flutter roller to assure that the roller measures the tape speed. The tachometer signal can be transferred into a voltage which is proportional to the tape speed to be compared to a desired reference speed in the tape speed servo circuit.

Such a system has a potential drawback that within the milliseconds during starting or stopping, the tape contact with the tape roller may vary. At start up, the tape starts to move slowly as soon as the take up reel motor starts to rotate. There may initially be no tape contact with the tape roller, the tape roller giving no information about the tape movement. The tape speed servo circuit then increases take up motor torque according to the transfer function in the servo circuit to speed up tape speed. The tape moves faster and tape torque increases until the tape reaches a tensioned state and suddenly contacts the tape roller. The roller then rapidly starts to give speed information, which in turn reduces the take up motor torque. However, the inertia in the tape supply reel continues to move the tape, reducing tape tension and reducing the tape/tape roller contact, again removing the speed information. Oscillations in the tape path can thus occur, due to the initial missing tape-to-roller contact. Such oscillations may stretch the tape so that it is completely destroyed. Even if the tape is not destroyed, smaller oscillations during start up increases the total start time. This means that it takes a longer time before data can be recorded or read from the tape.

The oscillations can be avoided by using tachometer information from the take up motor as input to the servo circuit until the tachometer information from the tape roller is verified as reliable. Reliable tachometer information can be detected and verified in a number of ways.

For example, it is possible to wait until the tape roller tachometer starts to output pulses.

It is also possibly advantageous to electronically ignore the first "n" pulses from the tape roller tachometer; or ignore the tape roller tachometer until a predetermined frequency of pulses is reached.

It is possible to use tachometer information from both tape rollers, and wait until both roller tachometers give speed information of about the same frequency. This indicates that the tape has good contact with both tape rollers.

It is possible to measure the speed difference between the take up motor, and the tape roller during earlier tape operation. Tachometer information from the roller is then ignored until it is in a predetermined range of the prior ratio of roller tachometer frequency to the tachometer frequency from the reel motor.

It is possible to wait until the supply reel motor tachometer has given a certain number of pulses. The supply reel motor can only move when the tape is in contact with both tape rollers.

It is possible to wait until the supply reel motor tachometer starts to output pulses with a certain stable frequency.

With all these methods, the speed signal of the tape roller is effectively ignored by the tape speed servo circuit until adequate tape tension insures an accurate tape speed signal.

During a stopping mode the functional relationship between the tape roller tachometer signal and the take up reel tachombeter signal is reversed, that is, during deceleration the controller switches to the take up reel tachometer signal and the tape roller tachometer signal is then ignored.

DETAILED DESCRIPTION OF THE PREFERRED EMBODIMENTS

Figure 1:
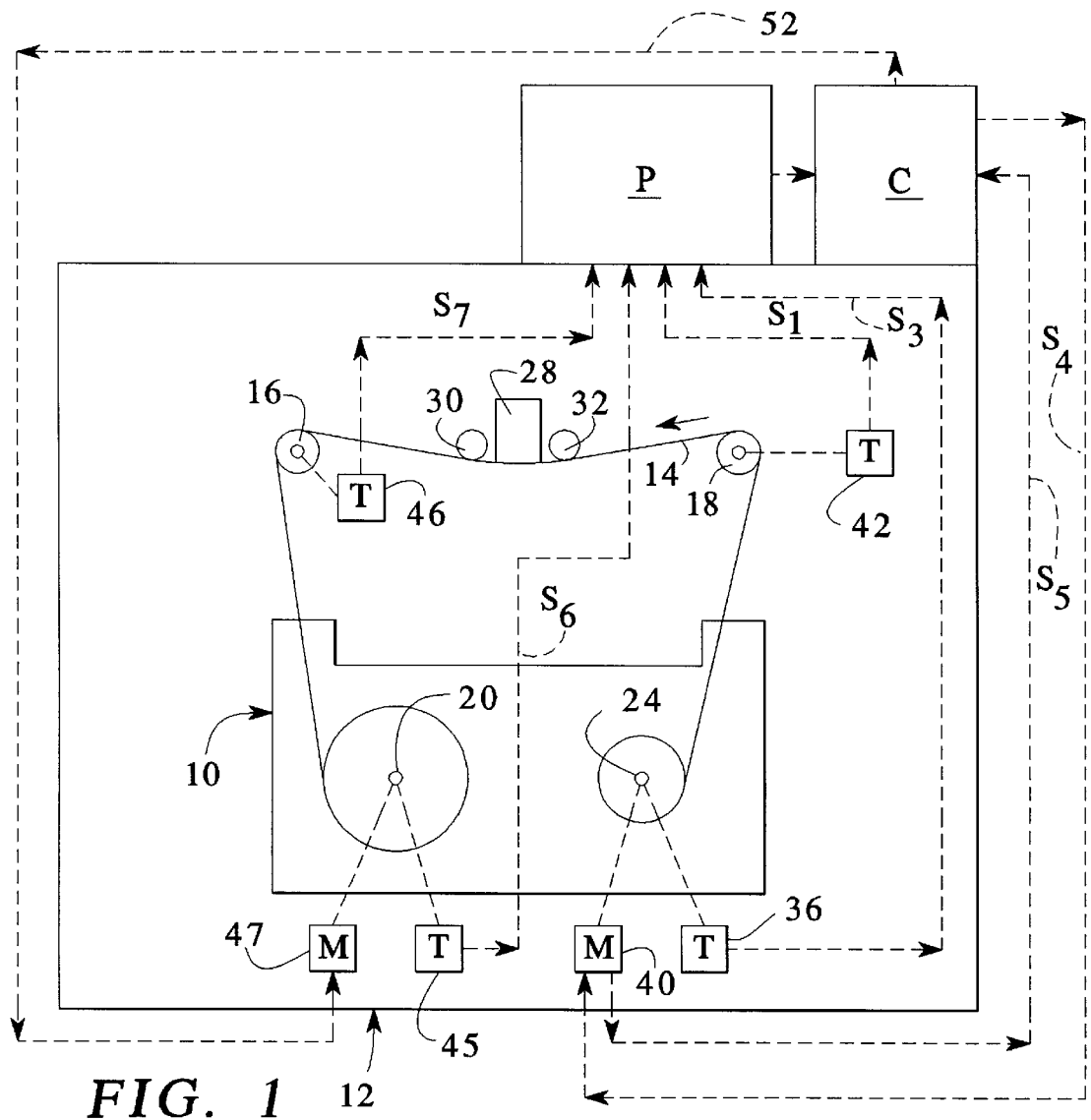
FIG. 1 is a schematic plan view of a cassette and tape drive of the present invention.

FIG. 1 illustrates the general environment of the tape drive and cassette of the present invention. In this figure, a cassette 10 is located within the tape drive 12. Tape 14 has been extracted from the cassette and is partially wrapped around a first tape roller 16 and a second tape roller 18. The rollers 16, 18 can be "flutter rollers". That is, the rollers turn with the circulating tape without need for a pinch roller. Inside the cassette are a first reel 20 and a second reel 24. Depending on the direction of winding one reel serves as supply reel and the respective other as take-up reel.

The direction of rotation of the supply and take up reel can be reversed for a reverse circulation of the magnetic tape.

Figure 2:
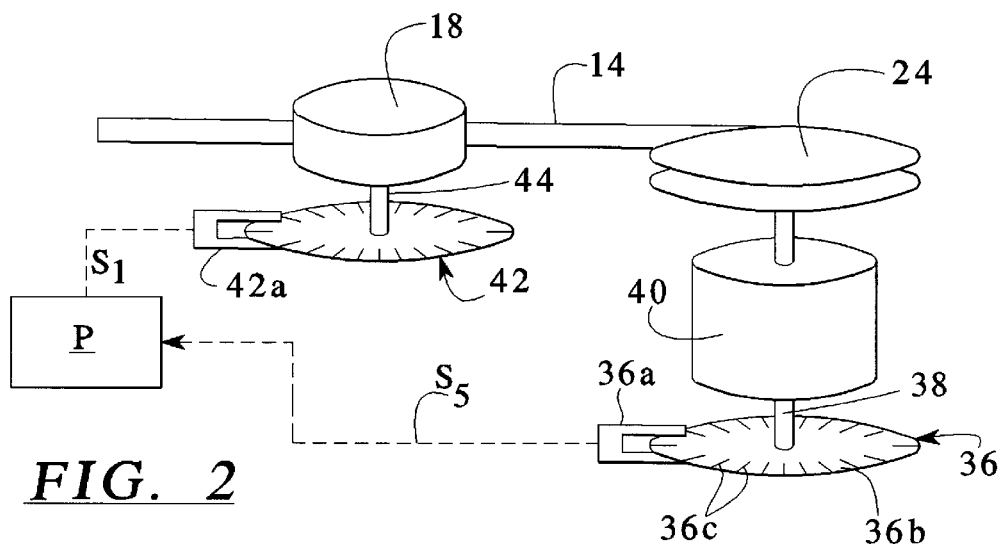
FIG. 2 is a partial perspective view of the tape drive and cassette shown in FIG. 1 according to the invention.

As shown in FIG. 2, at least one tape reel 24 acting as supply reel is provided with a reel pulse tachometer 36 rotatable about a axial shaft 38 of a tape reel motor 40. The tachometer 36 in the illustrated exemplary embodiment can be formed of a detector 36a and an optical coding disk 36b, the detector being an optoelectronic scanner and connected to an evaluation, or pulse processing unit P. The evaluation unit is connected to a controller C that emits control signals to the reel motors during normal operation. The controller C can be a microprocessor. The pulse processing unit P can possibly be eliminated depending on the sophistication of the controller C. Various methods of pulse tachometer processing for control are disclosed for example in U.S. Pat. Nos. 5,491,594; 5,150,263; 4,531,166; 4,696,439; and 4,514,672.

At least one tape roller 18 is also provided with a roller pulse tachometer 42 mounted on an axle 44 of the tape roller 18. The tachometer 42 can be configured identically to the tachometer 36. For a true bidirectional tape drive and cassette, the respective other tape reel 20 and the respective other tape roller 16 also have pulse tachometers 45, 46 respectively mounted axially on their rotating axles.

As FIG. 1 demonstrates, the controller C is provided which receives pulse information from the reel and roller tachometers 36, 42, 45, 46 by sensors 36a, 42a, 45a, 46a respectively, via the pulse processor P. This controller C controls motors, driving or braking the reels 20, 24 to maintain tape speed and tension, according to a tape speed servo circuit and a tape tension servo circuit. Particularly, a motor 50 coupled to the take up reel 20 transports the tape from the supply reel 24 while the supply reel motor 40 brakes slightly. This simple control scheme requires a minimum of mechanical parts compared to the prior art. A signal from at least one of the tape rollers 16, 18 corresponds to the tape speed measurement. Measuring the tape speed from a tape roller is a direct way to measure the tape speed.

The second tape roller 18 is used to obtain a symmetrical tape path, which is advantageous in a bidirectional tape transport. The two tape flutter rollers also absorb a high frequency speed variation, known as flutter. The lower frequency speed variations are controlled by the tape speed servo circuit of the controller.

The tape 14 is wrapped around the tape rollers 16, 18 circumscribing a significant angle. It has been found that this allows a reduction in the total tape friction, while providing an accurate signal, and accordingly reduces the tape tension at the take up reel 20.

The controller C tension servo circuit ensures that tape tension is constant. The controller speed servo circuit ensures that tape speed is as constant as possible. Thus, take up reel tension will be almost constant, only compensating for variation of tape friction in the tape path.

The controller tape speed servo circuit controls tape speed to a predetermined reference valve by using the tape roller tachometer signal.

Tape speed is most accurately measured directly by the tachometer frequency from the tape roller 16 or 18:

v is tape speed
$n_{tr}$ is tape roller tachometer frequency
$r_{tr}$ is tape roller radius in tape path
$N_{tr}$ is number of tachometer pulses per rotation of the tape roller $$v = n_{tr} \cdot 2 \cdot \pi \cdot \frac{r_{tr}}{N_{tr}}$$

The controller C compares the tape speed with a preselected reference tape speed and sends to the motor 20 (take-up motor) a correction signal $S_2$, to increase or decrease rotary speed. The correction signal can be a signal to a motor controller having a power amplifier to increase electric power to drive the motor.

The tachometer signal $S_1$ can be transformed into a voltage which is proportioned to tape speed. An analog part of the servo circuit can consist of an amplifier and a filter. The amplifier compares two voltages, the preselected reference tape speed and the voltage proportional to the measured tape amplified and low pass filtered, so that the servo loop is stable.

The distance between the take up tape reel 20 and the tape roller 16 becomes an important part of the servo loop. The distance adds a delay and low pass filter to the servo transfer function. This must be taken into account in order to achieve a stable servo loop. The tape roller 16 as flutter type roller, is designed with low inertia to reduce the delay and low pass filter effect. The tape roller tachometer 46 is so accurate that the servo loop becomes an electronic flywheel.

A signal $S_6$ from the take up reel tachometer 45 may be compared to a tape roller tachometer signal $S_7$ from the tachometer 46. These speeds allow for the calculation of the radius of the tape fill on the take up reel 20. This radius affects the servo loop stability. Thus, information about this radius may be used to vary the loop gain so that the servo loop is stable from the beginning to the end of the tape.

The controller tape tension servo circuit sets the braking resistance of the supply reel by controlling supply reel motor current $I_{MOT}$. The motor current is measured and a signal is fed back to the tension servo circuit which calculates the corrected motor current $I_{MOT}$.

Tape tension is determined, not by a mechanical element which adds to tape path friction and other problems, but by comparing the relative pulse frequencies of the roller tachometer 42 with the supply reel tachometer 36. By knowing the relative rotational velocities, the amount of tape on the supply reel can be determined and the appropriate amount of rotary resistance, or "braking moment" can be applied to the supply reel motor. The controller C for example receives the pulse frequency signal $S_3$ from the supply reel tachometer 36 via the processor P and using the signal $S_1$ calculates the required braking moment for the supply reel 24, by signal $S_4$ to the motor 40. As the tape depletes from the supply reel 24 to the take up reel 20, the braking moment on the motor 40 must decrease to maintain constant tape tension. The controller C periodically recalculates using the signals $S_1$ and $S_3$ and controls the current on the motor 40 by signal $S_4$. Current on the motor 40 can be measured as signal $S_5$, the signal $S_5$ being a correction signal fed back to the controller as part of a tension servo loop.

Tape tension is calculated from pulse frequencies of the supply reel 24 and one of the tape rollers 16, 18. Many different formulas for accurate or approximated calculation of tape tension may be used. Also, if the cassette gives information on tape thickness and tape length, the tape tension can be calculated by use of this data and pulse frequencies on both tape hubs. The calculated supply reel motor current for maintaining a reference, constant tape tension is described below.

M is motor torque on supply reel $n_{tr}$ is tachometer frequency for the flutter roller $N_{tr}$ is number of tachometer pulses per rotation for the flutter roller $n_{sr}$ is tachometer frequency for the supply reel $N_{sr}$ is number of tachometer pulses per rotation for the supply reel F is tape tension between the flutter roller and the supply reel $r_{tr}$ is radius of the flutter roller in the tape path.

$$M = \frac{n_{tr}}{N_{tr}} \cdot \frac{r_{tr}}{n_{sr}} \cdot N_{sr} \cdot F$$

The motor current is calculated as $$M = K_T \cdot I_{MOT} \Rightarrow I_{MOT} = \frac{M}{K_T}$$

where $K_T$=motor constant (torque constant) N/A (Newton/Ampere).

Thus, $$I_{MOT} = \frac{1}{K_T} \frac{n_{tr}}{N_{tr}} \cdot \frac{r_{tr}}{n_{sr}} \cdot N_{sr} \cdot F$$

A particularly advantageous use of the controller C is to secure sufficient tape tension at the start of write or read, by setting the brake moment on the supply reel primarily to the same level as expected for a supply reel full of tape. This braking is then softly reduced when the controller has got information about the speeds of reels and rollers to make corrections by the tape tension servo circuit.

Figure 3A:
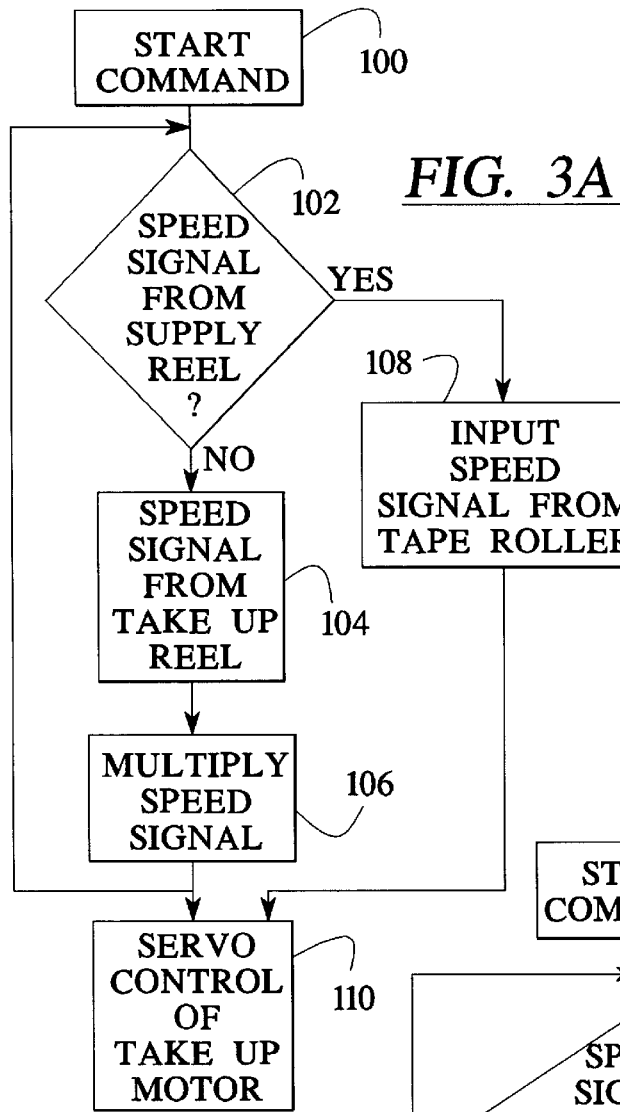
FIGS. 3A–3D are schematic flow sheets demonstrating alternate operations of the invention.

FIGS. 3A–3D illustrate control block diagrams of variations of the present invention. In FIG. 3A and FIG. 4, a method is described to ensure only a legitimate tape speed signal is provided to the tape speed servo circuitry in the controller C. In this regard, upon start up of the take up reel 20 by the motor 50 at step 100, motion of the supply reel is continuously monitored at step 102. A pulse frequency corresponding to the speed of the take up reel 20 is output as signal $S_6$, at step 104. The signal $S_6$ is multiplied four times by a 4× multiplier 156, at step 106, as an approximation of the faster pulse frequency normally output by the roller tachometer 46. This results in multiplied signal $S_8$. This is due to the fact that the particular tape fill on the take up reel will typically have a larger diameter than the roller 18 and thus a smaller pulse frequency given equivalent tachometer marks per rotation. A 4× multiplier is selected because the tachometer frequency of the drive motor is typically 3–10 times lower than the tape flutter roller tachometer frequency. The multiplier 4× is chosen as a first-order estimate of the difference.

The tape tension servo circuit of the controller C does not allow turning of the supply reel 24 if the rollers 16, 18 are not engaged by the tape 14, i.e., the tape is still slack. Therefore, according to the scheme of FIGS. 3A and 4, at step 108 once the tape is drawn tight, a pulse signal $S_9$ is sent from the supply reel tachometer 36 to a detector 150 which after having received a certain number of pulses sends an electric control signal $S_{10}$ to a switch 154 which switches at step 102 the signal $S_8$ sent to the controller C to the signal $S_7$ from the roller tachometer 46 at step 110.

Alternately, rather than merely detecting the presence of pulses, the detector 150 can be configured to send the control signal $S_{10}$ when a stable frequency of pulses are detected from the supply reel tachometer 36.

Figure 3B:
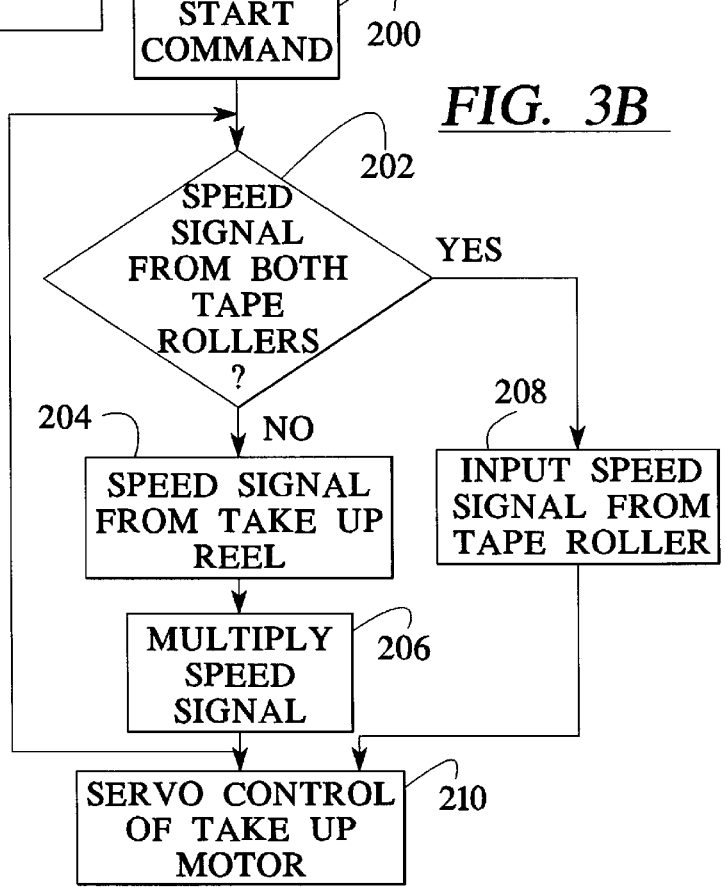
Figure 4:
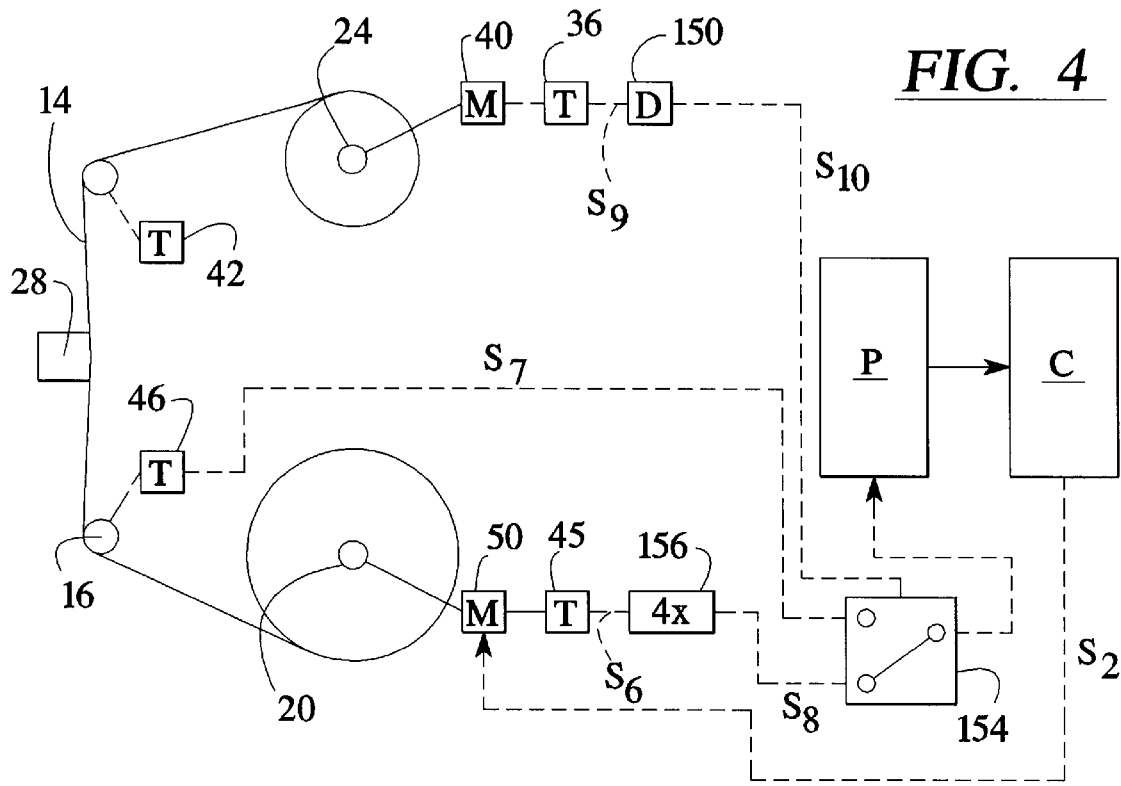
FIG. 4 is a schematic view of a first embodiment of the present invention.
Figure 5:
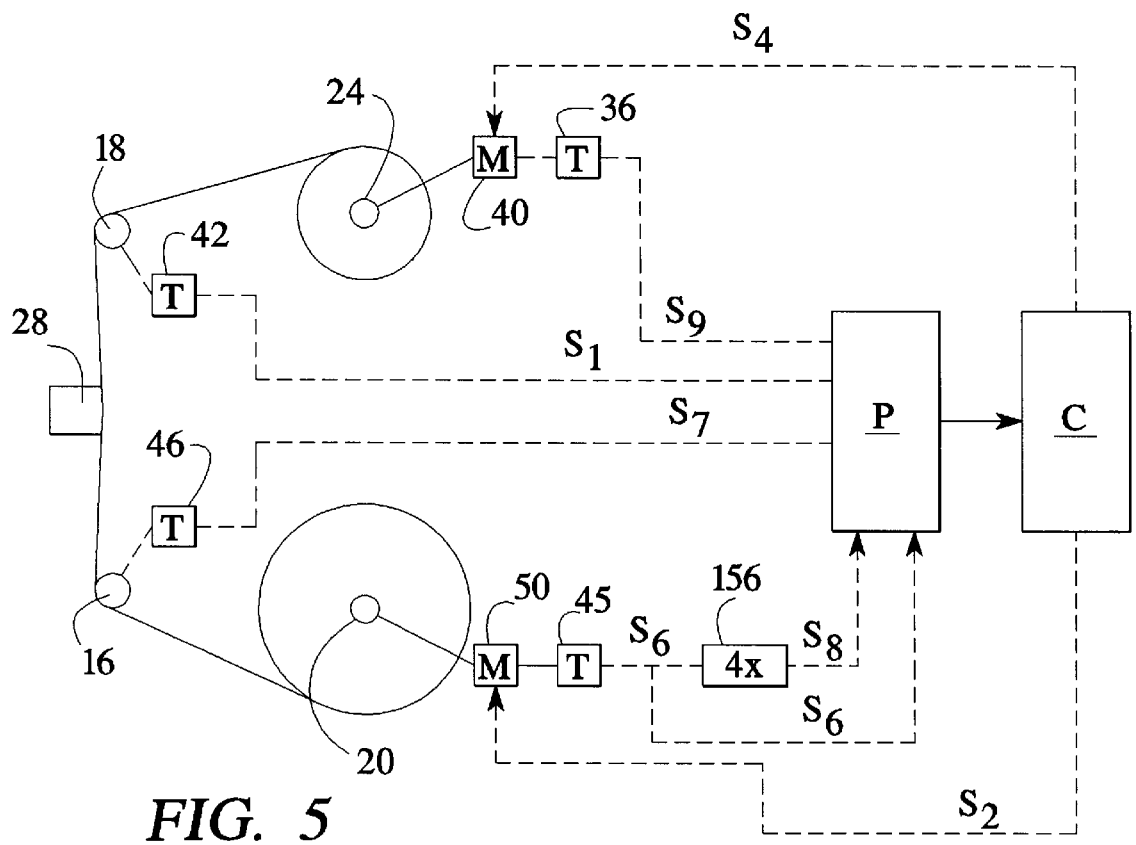
FIG. 5 is a schematic view of a second embodiment of the present invention.

FIG. 3B and FIG. 5 illustrate an alternate method. FIG. 5 uses the controller C in lieu of a switch to make decisions as to signal control. The controller C can be a microprocessor having in programming the equivalent of switches. A pulse processor or counter E can be used to condition and process pulse signals, and communicate with the controller C. In this embodiment, after start up at step 200, speed signals from both roller tachometers are continuously monitored at step 202. The reel tachometer pulse signal $S_8$ from the 4× multiplier 156 is used for speed control at steps 204, 206 until both pulse signal $S_7$ from the first tape roller tachometer 46 and a pulse signal $S_1$ from the second tape roller tachometer 42, at step 202, are received at the controller C, via the pulse processor P. Then the signal $S_8$ is switched, at step 202, by the controller C to the roller tachometer signal $S_7$ (or $S_6$) at step 208 for more accurate tape speed control at step 210.

Alternately, the controller can qualitatively ensure first that the pulse frequencies of the two roller tachometers 42, 46 are about the same frequency indicating good tape contact with both tape rollers before switching from the signal $S_8$ to the signal $S_7$.

Figure 3C:
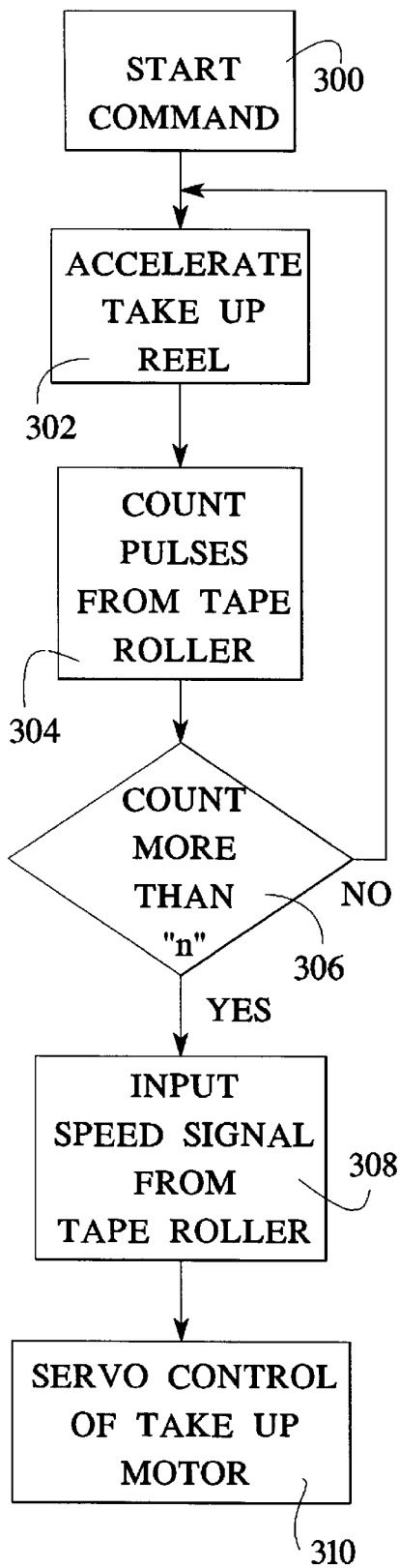

FIG. 3C and FIG. 5 illustrates another method of controlling tape speed. In this method, during start up at step 300 the take up reel speed is increased at step 302 from a stop while the speed servo of the controller C counts pulses at step 304 and ignores the first "n" pulses at step 306 from the roller tachometer 46, which can be of unstable frequency initially during this count, until full contact is made between roller 16 and tape 14. Thereafter, the switch is made at step 306 to servo control by signal $S_7$ at step 310. Alternatively, the roller tachometer signal $S_7$ can be ignored until a stable frequency pulse is reached.

Figure 3D:
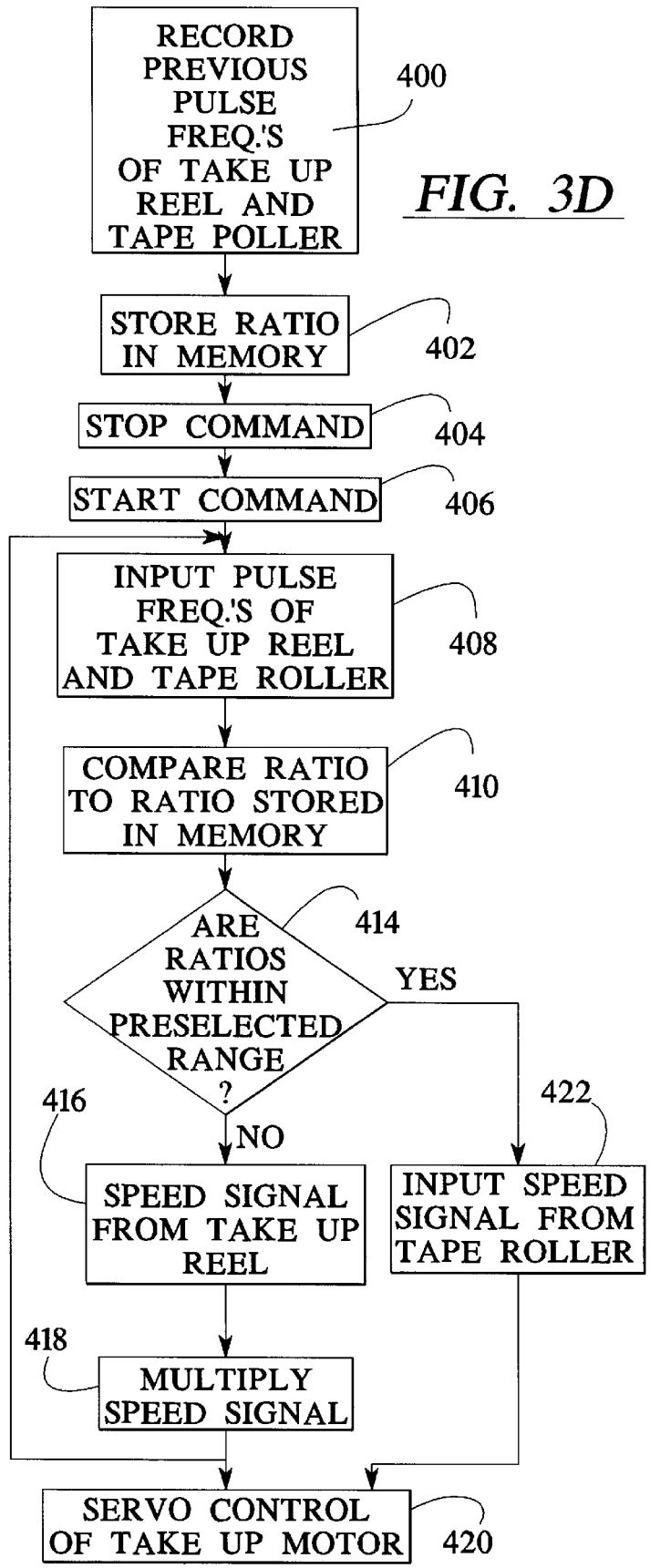

FIG. 3D and FIG. 5 illustrate an operating method wherein the previous operation of the reels and rollers and the relative pulse frequencies from their associated tachometers are pre-recorded at step 400 and stored in memory at step 402, and then the tape is eventually stopped, at step 404. Thereafter, after initial start up of the take up reel, at step 406, pulse frequencies of the take up reel and tape roller are continuously monitored at step 408 and their ratio is compared to the ratio stored in memory at step 410. If the ratio is not within a close range (step 414) the speed signal the take up reel $S_6$ is used for servo control. The signal $S_6$ is 4× multiplied at step 418 and the signal $S_8$ is used to adjust speed of the take up reel motor at step 420.

The ratio of $S_6$ and $S_7$ are sensed and compared during starting to the recorded ratio until the prior ratio between pulse frequencies of signals $S_6$ and $S_7$ is substantially reached. Thereafter, the signal $S_7$ is input instead of the signal $S_8$, at step 422, to control tape speed, at step 420.

Figure 6:
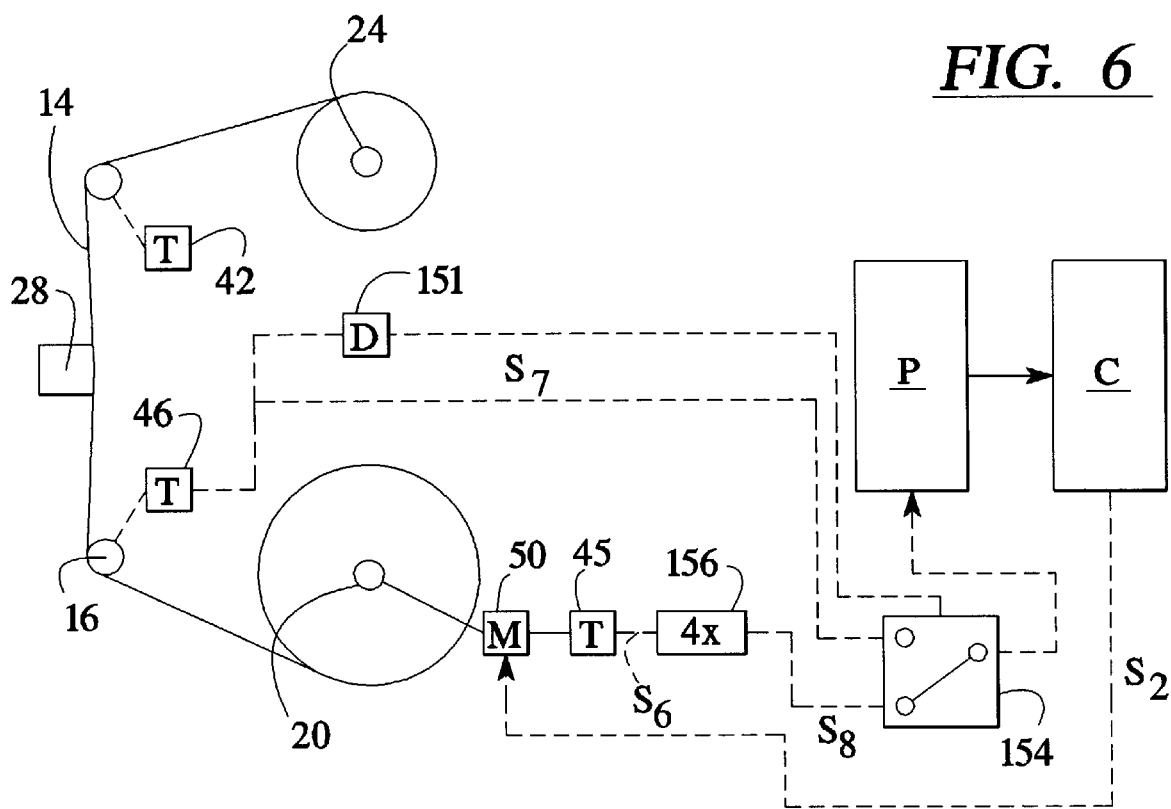
FIG. 6 is a schematic view of a third embodiment of the present invention.

Alternatively, as shown in FIG. 6, the signal for causing the switch 154 to change its switching state can be obtained from a detector 151 which identifies a characteristic of the speed signal from the tachometer 46. As described in connection with the detector 150, the detector 151, if the speed signal from the tachometer 46 is a digital signal formed by a number of pulses, can cause switching of the switch 154 upon counting a predetermined number of pulses in the speed signal, or upon an identification of a predetermined frequency, or upon an identification of a stable frequency.

When stopping, a controlled deceleration is needed to prevent overtensioning the tape. Thus, the take up reel and supply reel must be stopped in a coordinated ramp down fashion. During stopping the tension in the tape can decrease resulting in falling tape tension and an inaccurate speed signal from the tape roller tachometer. The above description of the start up mode of operation, wherein the tape roller tachometer is ignored until sufficient tape tension is achieved, is reversed for the stopping mode.

In the stopping mode, the signal $S_7$ from the roller tachometer which controls the tape speed servo circuit during normal operation is switched to the take up reel tachometer signal $S_8$ during the ramp down of the speed of the take up reel.

Although the present invention has been described with reference to a specific embodiment, those of skill in the art will recognize that changes may be made thereto without departing from the scope and spirit of the invention as set forth in the appended claims.

We claim as our invention:

1. A tape speed control arrangement for a tape drive comprising:

a tape speed controller;

a supply reel;

a take up reel having tape wound therearound, said tape extending to said supply wheel and being wound therearound;

a take up reel drive motor electrically connected to said controller, said controller sending a variable speed control signal to said take up reel drive motor to vary the rotational speed of said take up reel;

a tape roller arranged to press against a portion of said tape that extends between said take up reel and said supply reel, to rotate With circulation of said tape;

a tachometer connected to said tape roller to rotate therewith, said tachometer emitting a speed signal upon rotation of said tape roller due to circulation of said tape; and means for determining reliability of said speed signal and for supplying said speed signal to said controller only when said speed signal is reliable, said controller then processing said speed signal and adjusting said variable speed control signal dependent thereon.

2. A control arrangement as claimed in claim 1 wherein said tachometer comprises a first tachometer, and further comprising a second tachometer connected to rotate with said take up reel and emitting a further speed signal, and wherein said means for determining reliability comprises:

a switch receiving said speed signal from said first tachometer and said further speed signal from said second tachometer, said switch initially being in a switching state for supplying said further speed signal to said controller;

a third tachometer connected to said supply reel to rotate therewith and emitting a rotational signal upon a beginning of rotation of said supply reel; and a detector connected to said third tachometer and to said switch for detecting said rotational signal from said third tachometer and for thereupon causing said switch to switch to a state for supplying said speed signal from said first tachometer to said controller instead of said further speed signal.

3. A control arrangement as claimed in claim 1 wherein said tachometer comprises a first tachometer, and wherein said speed signal comprises a series of pulses, and further comprising a second tachometer connected to rotate with said take up reel and emitting a further speed signal, and wherein said means for determining reliability comprises:

a switch receiving said speed signal from said first tachometer and said further speed signal from said second tachometer, said switch initially being in a switching state for supplying said further speed signal to said controller; and a detector supplied with said speed signal from said first tachometer and emitting a switching signal to said switch upon detecting a predetermined characteristic of said pulses in said speed signal and thereupon emitting a switching signal to said switch for causing said switch to switch to a state for supplying said speed signal from said first tachometer to said controller instead of said further speed signal.

4. A control arrangement as claimed in claim 3 wherein said detector comprises a counter which counts a predetermined number of pulses in said speed signal and thereupon emits said switching signal.

5. A control arrangement as claimed in claim 3 wherein said detector comprises means for identifying a frequency of said pulses of said speed signal and for emitting said switching signal when said pulses exhibit-a predetermined frequency.

6. A control arrangement as claimed in claim 3 wherein said detector comprises means for identifying a frequency of said pulses of said speed signal and for emitting said switching signal when said pulses exhibit a stable frequency.

7. A control arrangement as claimed in claim 1 wherein said tachometer comprises a first tachometer, and further comprising a second tape roller disposed between said first tape roller and said supply reel, and a second tachometer connected to rotate with said second tape roller and emitting a further speed signal, and wherein said means for determining reliability comprises:

a comparing circuit supplied with said speed signal from said first tachometer and said further speed signal from said second tachometer, said comparing circuit comparing said speed signal and said further speed signal and only when said speed signal and said further speed signal are substantially equal, supplying said speed signal from said first tachometer to said-controller.

8. A control arrangement as claimed in claim 1 wherein said tachometer comprises a first tachometer, and further comprising a second tachometer connected to rotate with said take up reel and emitting a further speed signal, and wherein said means for determining reliability comprises:
   a memory in which a speed signal relationship between said speed signal and said further speed signal is stored during normal operation; and
   a comparing circuit having access to said memory and being supplied with said speed signal from said tachometer an (a current further speed signal from said second tachometer, said co paring circuit determining when a speed signal relationship between sa d current speed signal and said current further speed signal is equivalent to the speed relationship stored in said memory, and only thereupon causing said current speed signal to be supplied to said controller.

9. A method for tape speed control for a tape drive comprising the steps of:
   winding a tape on a supply reel and on a take p reel with a portion of said tape extending between said supply reel and said take up reel;
   transporting said tape between said supply reel and said take up reel by rotating said take up reel with a take up reel drive motor;
   generating a variable speed control signal a Id providing said variable speed control signal to said take up reel drive motor to vary the rotational speed of said take up reel;
   pressing a tape roller against said portion of aid tape extending between said take up reel and said supply reel, to rotate with transport of said tape;
   connecting a tachometer to said tape roller to rotate therewith, and emitting a speed signal from said tachometer up n rotation of said tape roller due to transport of said tape; and
   determining reliability of said speed signal an using said speed signal to adjust said variable speed control signal only when said speed signal is reliable.

10. A method as claimed in claim 9 wherein said tachometer comprises a first tachometer, and comprising the further steps of connecting a second tachometer to rotate with said take up reel and emitting a further speed signal from said second tachometer, and wherein the steps of generating said variable speed control signal and adjusting said variable speed control signal are conducted in a controller, and wherein the step of determining reliability comprises the steps of:
   supplying said speed signal from said first tachometer and said further speed signal from said second tachometer to a switch, and setting said switch initially in a switching state for supplying said further speed signal to said controller;
   connecting a third tachometer to said supply reel to rotate therewith and emitting a rotational signal from said third tachometer upon a beginning of rotation of said supply reel; and
   detecting said rotational signal from said third tachometer and thereupon causing said switch to switch to a state for supplying said speed signal from said first tachometer to said controller instead of said further speed signal.

11. A method as claimed in claim 9 wherein said tachometer comprises a first tachometer, and wherein said speed signal comprises a series of pulses, and comprising the further steps of connecting a second tachometer to rotate with said take up reel and emitting a further speed signal from said second tachometer, and wherein the steps of generating said variable speed control signal and adjusting said variable speed control signal are conducted in a controller, and wherein the step of determining reliability comprises the steps of:
   supplying said speed signal from said first tachometer and said further speed signal from said second tachometer to a switch, and setting said switch initially in a switching state for supplying said further speed signal to said controller; and
   detecting a predetermined characteristic of said pulses in said speed signal and thereupon providing a switching signal to said switch for causing said switch to switch to a state for supplying said speed signal from said first tachometer to said controller instead of said further speed signal.

12. A method as claimed in claim 11 wherein the steps of detecting comprises counting a predetermined number of pulses in said speed signal and thereupon providing said switching signal.

13. A method as claimed in-claim 11 wherein the step of detecting comprises identifying a frequency of said pulses of said speed signal and providing said switching signal when said pulses exhibit a predetermined.frequency.

14. A method as claimed in claim 11 wherein the step of detecting comprises identifying a frequency of said pulses 6f said speed signal and providing said switching signal only when said pulses exhibit a stable frequency.

15. A method as claimed in claim 9 wherein said tachometer comprises a first tachometer, and comprising the further steps of pressing a second tape roller against a portion of said tape between said first tape roller and said supply reel, and connecting a second tachometer to rotate with said second tape roller and emitting a further speed signal from said second tachometer, and wherein the step of determining reliability comprises:
   comparing circuit comparing said speed signal and said further speed signal and only when said speed signal and said further speed signal are substantially equal, using said speed signal from said first tachometer to adjust said variable speed control signal.

16. A method as claimed in claim 9 wherein said tachometer comprises a first tachometer, and comprising the further steps of connecting a second tachometer to rotate with said take up reel and emitting a further speed signal from said second tachometer, and wherein the step of determining reliability comprises:
   obtaining a speed signal relationship between said speed signal and said further speed signal during normal operation and storing said speed signal relationship in a memos; and
   determining when a speed signal relationship between a current speed signal from said first tachometer and a current further speed-signal from said second tachometer is equivalent to the speed relationship stored in said memory, and only thereupon using said speed signal to adjust said variable speed control signal.

17. A method as claimed in claim 9 wherein said tachometer comprises a first tachometer, and comprising the further steps of connecting a second tachometer to said supply reel to rotate therewith and emitting a further speed signal from said second tachometer comprising a series of pulses, and wherein the steps of generating said variable speed control signal and adjusting said variable speed control signal are conducted in a controller, and wherein determining reliability comprises the steps of:

supplying said speed signal from said first tachometer and said further speed signal from said second tachometer to a switch connected to said controller, and setting said switch initially in a switching state for supplying said further speed signal to said controller; and detecting a predetermined characteristic of said pulses of said further speed signal, and only thereupon providing a switching signal to said switch causing said switch to supply said speed signal from said first tachometer to said controller instead of said further speed signal.

18. A method as claimed in claim 17 the step of detecting comprises counting a predetermined number of pulses of said further speed signal and only thereupon providing said switching signal.

19. A method as claimed in claim 17 the step of detecting comprises determining a frequency of said pulses of said further speed signal and providing said switching signal only when said pulses exhibit a predetermined frequency.

20. A method as claimed in claim 17 wherein the step of detecting comprises identifying a frequency of said pulses of said speed signal and providing said switching signal only when said pulses exhibit a stable frequency.

\* \* \* \* \*